US006757868B1

(12) United States Patent
Glaser et al.

(10) Patent No.: US 6,757,868 B1
(45) Date of Patent: Jun. 29, 2004

(54) PROGRAMMATIC SWITCHING OF ARBITRARY HTML FORMS

(75) Inventors: Howard Justin Glaser, San Jose, CA (US); Daniel Edward House, San Jose, CA (US); Constance Jane Nelin, Monte Sereno, CA (US); Rebecca Braun Nin, Morgan Hill, CA (US); Brian Joseph Owings, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 09/102,038

(22) Filed: Jun. 22, 1998

(51) Int. Cl.[7] .................................................. G06F 7/00
(52) U.S. Cl. ....................................................... 715/513
(58) Field of Search ................................ 707/501, 513; 715/501.1, 513; 345/760

(56) References Cited

U.S. PATENT DOCUMENTS

| | | | |
|---|---|---|---|
| 5,048,018 A | | 9/1991 | Bernstein et al. ............... 717/4 |
| 5,168,441 A | | 12/1992 | Onarheim et al. ............ 700/17 |
| 5,179,698 A | | 1/1993 | Bachman et al. ............... 707/4 |
| 5,193,182 A | | 3/1993 | Bachman et al. ........... 707/100 |
| 5,193,183 A | | 3/1993 | Bachman ........................ 707/1 |
| 5,195,178 A | | 3/1993 | Krieger et al. ............... 345/347 |
| 5,241,645 A | | 8/1993 | Cimral et al. ................... 703/2 |
| 5,249,300 A | | 9/1993 | Bachman et al. ........... 707/104 |
| 5,561,763 A | | 10/1996 | Eto et al. ....................... 714/35 |
| 5,572,643 A | | 11/1996 | Judson ........................ 709/218 |
| 5,623,656 A | | 4/1997 | Lyons ........................... 707/10 |
| 5,701,451 A | | 12/1997 | Rogers et al. .................. 707/1 |
| 5,715,453 A | | 2/1998 | Stewart ....................... 707/104 |
| 5,742,768 A | * | 4/1998 | Gennaro et al. ....... 295/200.33 |
| 5,809,317 A | * | 9/1998 | Kogan et al. ............... 395/762 |
| 5,953,731 A | * | 9/1999 | Glaser ........................ 707/513 |
| 5,960,429 A | * | 9/1999 | Peercy et al. .................. 707/5 |
| 5,978,807 A | * | 11/1999 | Mano et al. .................. 707/10 |
| 5,983,245 A | * | 11/1999 | Newman et al. ............ 707/513 |
| 5,999,912 A | * | 12/1999 | Wodarz et al. ................ 705/14 |
| 6,003,046 A | * | 12/1999 | Nielsen ...................... 707/513 |
| 6,038,598 A | * | 3/2000 | Daneels ...................... 709/219 |

OTHER PUBLICATIONS

Holzner, Java 1.1: No experience required, SYBEX, Inc. pp., 348–351, 362–365, Dec. 1997.*
Oliver et al, Netscape 3 Unleashed, second edition, Sams.net Publishing, pp. 353, 354, 566, 567, Dec. 1996.*
Oliver et al, Sams' Teach Yourself HTML 4 in 24 Hours, second edition, Sams.net Publishing, pp. 32–34, Dec. 1997.*

\* cited by examiner

*Primary Examiner*—Stephen S. Hong
*Assistant Examiner*—C B Paula
(74) *Attorney, Agent, or Firm*—Gates & Cooper LLP; Prentiss Johnson

(57) ABSTRACT

A method, apparatus, article of manufacture, and memory for programmatically switching arbitrary HTML pages is disclosed. The method includes the steps of receiving control information in an application server from a client computer, and executing a script in the application server to generate a map relating HTML files with commands to show pages related to the HTML files. When a control event is received from the client computer, the mapping provides a basis for commanding the client computer's browser to switch to a second HTML page. In one embodiment, the invention also includes a program storage device, tangibly embodying instructions for performing the above method steps. The invention also includes an apparatus for remotely scripting local objects. The apparatus includes an application server having device such as a computer for receiving control information from a client computer, and a device for executing a script using the control information to generate a map relating a second HTML file with a command to show the HTML file.

16 Claims, 13 Drawing Sheets

| Form Name | Maps to HTML File |
|---|---|
| Form 1 | Fusion1.HTML |
| Form 2 | Fusion2.HTML |

FIG. 14

PROGRAMMATIC SWITCHING OF ARBITRARY HTML FORMS

CROSS-REFERENCE TO RELATED APPLICATIONS

This application is related to the following commonly-assigned patent applications:

application Ser. No. 09/102,323, entitled "REMOTE DEBUGGING OF INTERNET APPLICATIONS," filed on Jun. 22, 1998 by Daniel E. House and Brian J. Owings, now U.S. Pat. No. 6,119,247, issued Sep. 12, 2000.

application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on Mar. 31, 1997 by Daniel E. House, Brian J. Owings, and Shiau-Shiau Pei, now U.S. Pat. No. 6,145,119, issued Nov. 7, 2000.

application Ser. No. 08/828,476, entitled "SHARED OBJECT MODEL," filed on Mar. 31, 1997, by Brian J. Owings, Shiau-Shiau Pei, and Daniel E. House, now U.S. Pat. No. 5,890,158, issued Mar. 30, 1999.

application Ser. No. 08/828,989, entitled "METHOD AND APPARATUS FOR SIMULATING A MULTI-TIERED COMPUTER ENVIRONMENT," filed on Mar. 31, 1997, by Daniel E. House and Constance J. Nelin, now U.S. Pat. No. 5,940,593, issued Aug. 17, 1999.

application Ser. No. 08/828,478, entitled "MULTI-TIER VIEW PROJECT WINDOW," filed on Mar. 31, 1997, by Howard J. Glaser, Daniel E. House, and Constance J. Nelin, now U.S. Pat. No. 5,953,525, issued Sep. 14, 1999.

application Ser. No. 08/829,104, entitled "EXTENDER USER INTERFACE," filed on Mar. 31, 1997, by Thomas E. Conrad, Howard J. Glaser, Jean C. Ho, James L. Keesey, Constance J. Nelin, and Gerold J. Wilmot, now U.S. Pat. No. 6,069,627, issued May 30, 2000.

application Ser. No. 08/828,846, entitled "SHARED MODULES GRAPHICAL USER INTERFACE," filed on Mar. 31, 1997, by Howard J. Glaser, Daniel E. House, and Constance J. Nelin, now U.S. Pat. No. 5,956,036, issued Sep. 21, 1999.

application Ser. No. 08/828,479, entitled "QUERY SELECTION FOR A PROGRAM DEVELOPMENT ENVIRONMENT," filed on Mar. 31,1997, by Howard J. Glaser and Mary C. Lehner, now U.S. Pat. No. 5,911,075, issued Jun. 8, 1999.

application Ser. No. 08/828,477, entitled "DOCKING AND FLOATING MENU/TOOL BAR," filed on Mar. 31, 1997, by Howard J. Glaser, Karl D. Johnson, and Stewart E. Nickolas, now U.S. Pat. No. 5,883,626, issued Mar. 16, 1999.

application Ser. No. 08/828,890, entitled "HTML INTEGRATION UTILITY FOR A PROGRAM DEVELOPMENT ENVIRONMENT," filed on Mar. 31,1997; by Howard J. Glaser, now U.S. Pat. No. 5,953,731, issued Sep. 14, 1999.

application Ser. No. 08/828,897, entitled "EXTENDER SMART GUIDE," filed on Mar. 31, 1997, by Howard J. Glaser, now U.S. Pat. No. 6,058,264, issued May 2, 2000.

application Ser. No. 08/828,481, entitled "MULTI-TIER DEBUGGING," filed on Mar. 31, 1997, by Daniel E. House, Brian J. Owings, and Shiau-Shiau Pei, now U.S. Pat No. 6,061,517, issued May 9, 2000.

application Ser. No. 08/828,990, entitled "DYNAMIC DISCOVERY OF CONTROLS," filed on Mar. 31, 1997, by Daniel E. House and Constance J. Nelin, now U.S. Pat. No. 5,875,322, issued Feb. 23, 1999.

application Ser. No. 08/828,480, entitled "REMOTE SCRIPTING OF LOCAL OBJECTS," filed on Mar. 31, 1997, by Daniel E. House, Constance J. Nelin, and Rebecca B. Nin, now U.S. Pat. No. 6,188,400, issued Feb. 13, 2001.

application Ser. No. 08/928,621, entitled "DYNAMICALLY DEBUGGING USER-DEFINED FUNCTIONS AND STORED PROCEDURES,") filed on Sep. 12, 1997, by Constance J. Nelin, Gerald H. Roth, Frederick T. Sharp, and Shu-Huar J. Yeh, now U.S. Pat. No. 6,253,368, issued Jun. 26, 2001.

application Ser. No. 08/928,620, entitled "STORING P-CODE IN A DATABASE," filed on Sep. 12, 1997, by Curt L. Cotner, Wendy L Koontz, Gerald H. Roth, Frederick T. Sharp and Shu-Huar J. Yeh, now U.S. Pat. No. 6,424,974, issued Jul. 23, 2002. and application Ser. No. 08/928,358, entitled "COMPONENT-NEUTRAL BUILDER INTERFACE," filed on Sep. 12, 1997, by Daniel E. House and Brian J. Owings, now U.S. Pat. No. 6,212,673, issued Apr. 3, 2001.

all of which applications are incorporated by reference herein.

BACKGROUND OF THE INVENTION

1. Field of the Invention.

This invention relates in general to programming development environments performed by computers, and in particular, to a method and apparatus for programmatically switching arbitrary HTML forms.

2. Description of Related Art.

With the fast growing popularity of the Internet and Intranets, especially Web-based networks, there is also a fast growing demand for access to server-hosted applications via the Internet. Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

The Internet has considerable potential to provide access to powerful and complex applications implemented at the Web server to a broad scope of remote clients. This implementation has important benefits such as reducing computer memory and processing requirements at the remote client, and increasing the security of the application by retaining selected portions of the application in a secure location in the Web server.

In programming applications for the Internet, it is sometimes desirable to switch pages presented to the user from a user-selected page to another HTML page. Although this can be implemented by simply prompting the user to enter a different HTML page, it is more desirable for this process to occur programmatically. Programmatic switching allows logic running in the server to determine that the HTML page being viewed in a browser should change. The logic decides which page to go to, and causes the browser to show the new page without user intervention. The user typically invokes programmatic switching by selecting a browser-displayed element, for example, by clicking a button.

One way to implement this functionality is disclosed by MICROSOFT's Active Server Pages. In this implementation, HTML pages on the server contain embedded logic written in VBScript. Before a user-selected page is downloaded to the browser, logic is run to determine whether a different HTML page should be returned to the browser. This "page pushing" technique works well but has a major disadvantage in that it only works with Active Server Pages and it will not work with arbitrary HTML.

Arbitrary HTML (that is, HTML generated with an arbitrary authoring tool, such as NETOBJECT's FUSION, or MICROSOFT's FRONTPAGE) can be served by any HTML or web server. Hence, unlike Active Server Pages, arbitrary HTML does not require a special HTML server or special logic inserted into the HTML itself. However, arbitrary HTML logic running on the server can not "switch pages" without actually generating the new page itself (which is then not arbitrary, but generated explicitly).

From the foregoing, it is apparent that there is a need for the ability to programmatically switch arbitrary HTML pages. The present invention satisfies that need.

SUMMARY OF THE INVENTION

To overcome the limitations in the prior art described above, and to overcome other limitations that will become apparent upon reading and understanding the present specification, the present invention discloses a method, apparatus, article of manufacture, and memory for programmatic switching of arbitrary HTML forms.

The method comprises the steps of receiving control information in an application server from a client computer, and executing a script in the application server to generate a map relating HTML files with commands to show pages related to the HTML files. When a control event is received from the client computer, the mapping provides a basis for commanding the client computer's browser to switch to a second HTML page. In one embodiment, the invention also comprises a program storage device, tangibly embodying instructions for performing the above method steps.

The invention also comprises an apparatus for remotely scripting local objects. The apparatus includes an application server having means such as a computer for receiving control information from a client computer, and a means for executing a script using the control information to generate a map relating a second HTML file with a command to show the second HTML file.

The present invention thus allows switching of HTML forms without the need for a special server to serve the pages or logic to be inserted into the HTML pages. Unlike current systems, which essentially "push" new HTML pages to the client computer, the present invention commands the browser to "pull" new HTML pages from an an HTML server.

The present invention can be used with any authoring tool and any HTML server. The present invention also allows future modification of the HTML to be made without affecting the application logic. This is advantageous for security reasons, because persons authorized to change HTML may not be authorized to change application logic.

BRIEF DESCRIPTION OF THE DRAWINGS

Referring now to the drawings in which like reference numbers represent corresponding parts throughout:

FIG. 14 is a diagram showing a mapping from form names to corresponding HTML files in an arbitrary HTML authoring tool.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. In one embodiment, the applications constructed using the RAD tool are primarily oriented towards data access, data manipulation and data rendering, especially in conjunction with relational database management systems (RDBMS).

Hardware Environment

Figure 1:
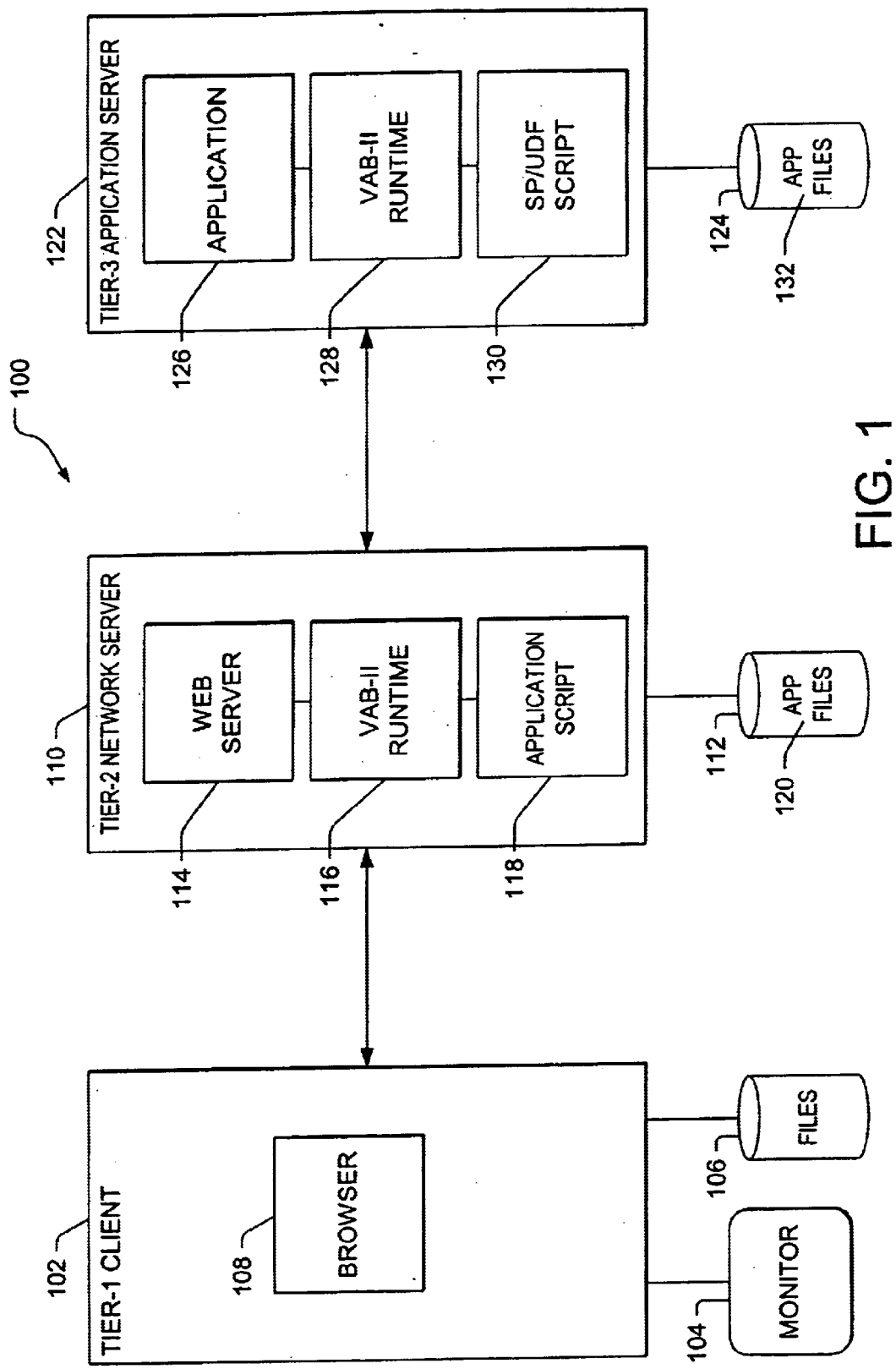
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and, optionally, one or more data storage devices 106. In the preferred embodiment, the client computer 102 executes a browser 108 capable of containing and executing applets, such as MICROSOFT's INTERNET EXPLORER or NETSCAPE's NAVIGATOR. The browser 108 communicates with programs on other tiers through HTTP (Hypertext Transfer Protocol), sockets, or other communications mechanisms.

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 having access to HTML forms 208 (such as IBM, MICROSOFT, or HTTP daemons) communicates with the browser 108 and the third tier via HTTP, APIs, sockets, or other communications mechanisms. The VAB-II runtime module 116 executes the application scripts 118 and communicates with the third tier. The application scripts 118 (such as LOTUSSCRIPT scripts) can contain programming logic for communicating with -both the browser 108 and the third tier. Preferably, the application scripts 118 include Basic programming instructions, JAVA, ACTIVEX, or DLL applet controls, embedded SQL, and other mechanisms known in the art.

The third tier comprises a application server 122 having one or more data storage devices 124 connected thereto. In the preferred embodiment, the application server executes a plurality of computer programs or applications 126, a persistent VAB-II runtime module 128, and Stored Procedure (SP) and User Defined Function (UDF) scripts 130 retrieved from an APP file 132 stored on a data storage device 124. The application 126 (such as IBM's DB2 product) receives requests either directly from tier-2 and/or indirectly from tier-2 via the VAB-II runtime module 128, and then performs the desired application functions. The VAB-II runtime module 128 executes the SP/UDF scripts 130. The SP/UDF scripts 130 comprise programming logic for accessing the application 126 and communicating with the tier-2 computer programs.

Figure 2:
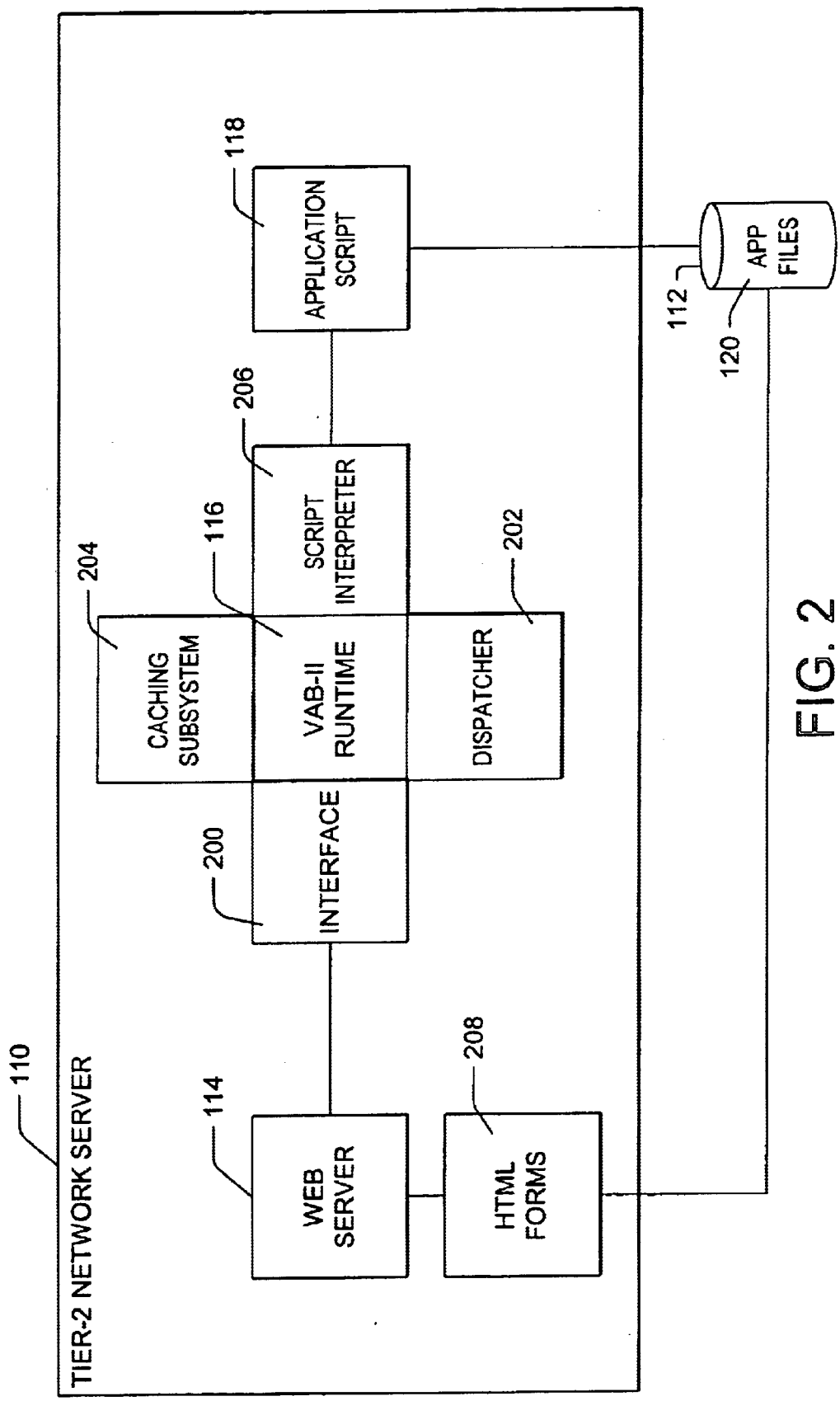
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), NETSCAPE Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
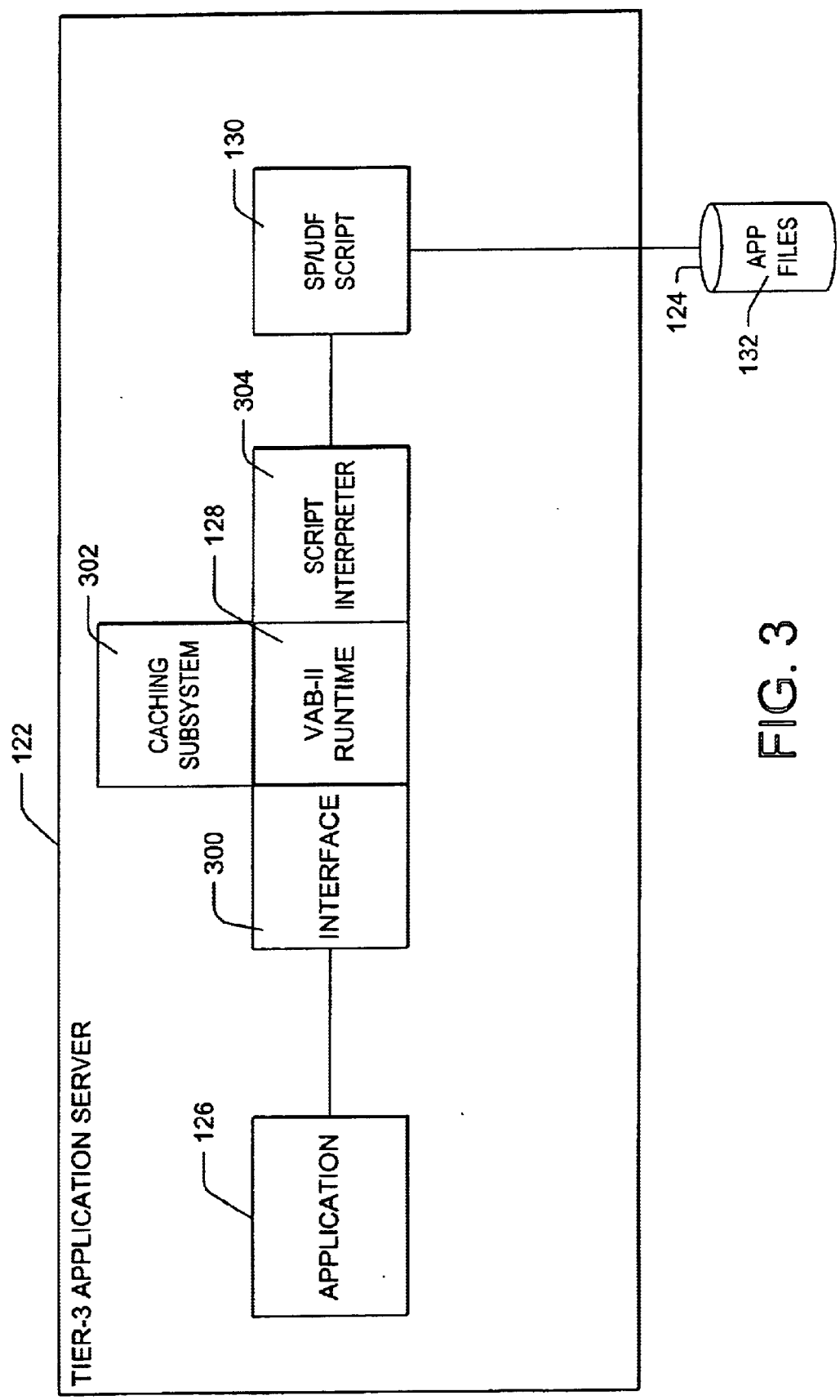
FIG. 3 is a block diagram that further illustrates the components of the application server in the present invention.

FIG. 3 is a block diagram that further illustrates the components of the application server 122 in the present invention. The VAB-II runtime module 128, for example, includes an interface 300 to the application 126, a caching subsystem 302, and a script interpreter 304 for executing one or more SP/UDF scripts 130 retrieved from one or more APP files 132 store on the data storage device 124. No dispatcher is required for the VAB-II runtime module 128 in the application server 122. The interface 300 provides a mechanism for invoking the VAB-II runtime module 128 from the application server 122 via a dynamic link library (DLL) or some other protocol. As in the network server 110 the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices. Programs of instructions for carrying out the operations performed at any of the three tiers can be tangibly embodied in one or more data storage devices 106, 112, 124.

Development Environment

Figure 4:
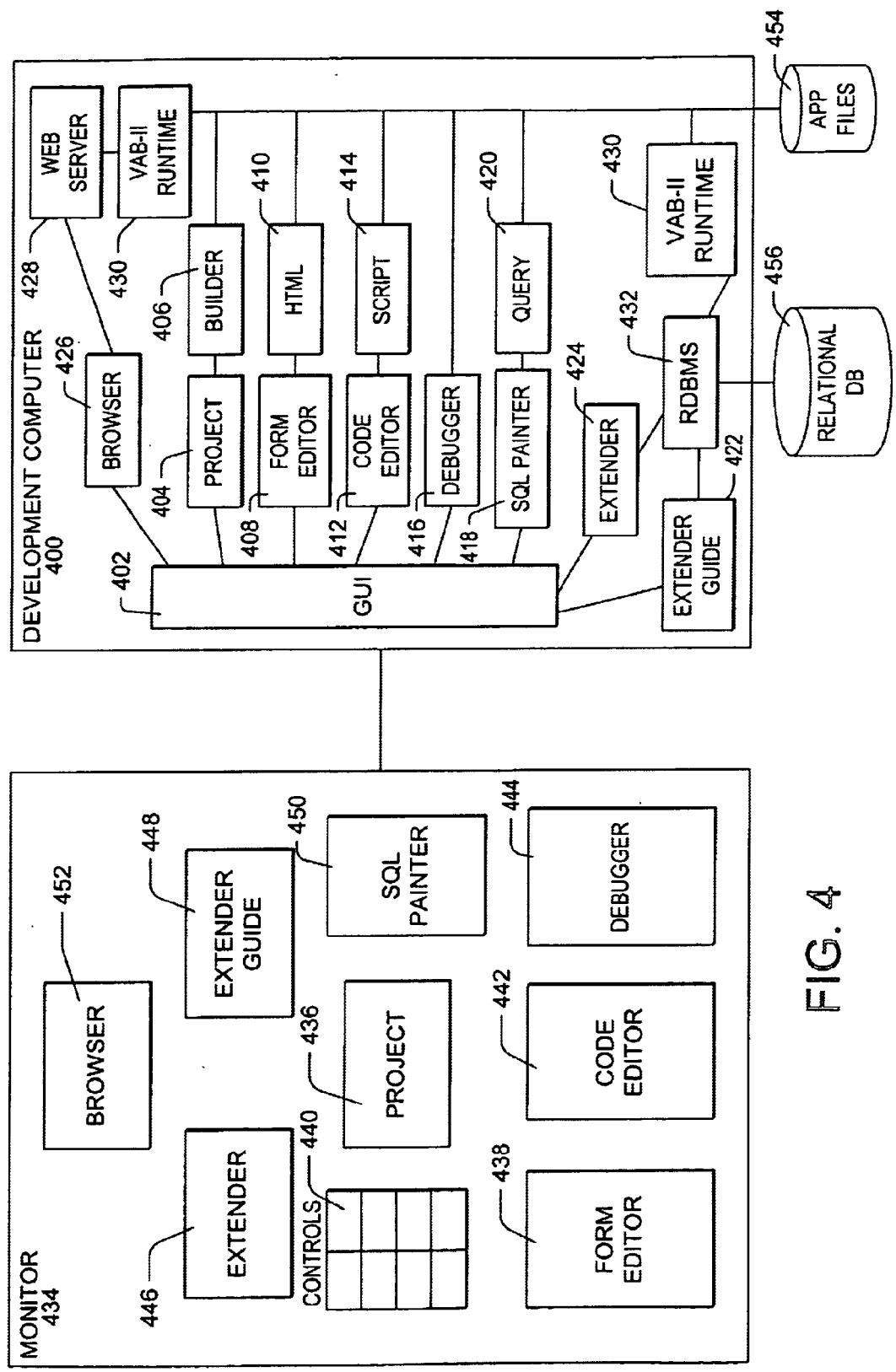
FIG. 4 is a block diagram that illustrates the development environment of the present invention.

FIG. 4 is a block diagram that illustrates the development environment of the present invention. For illustrative purposes, the application 126 in this embodiment is a a relational database management system (RDBMS). A development computer 400 executes a Rapid application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II communicatively coupled to APP file storage 4, runtime module 430, and RDBMS 432 which operates with relational database 456. The RAD tool displays a user interface on a monitor 434 attached to the development computer 400 which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, WINDOWS, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400 causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Controls

Figure 5A:
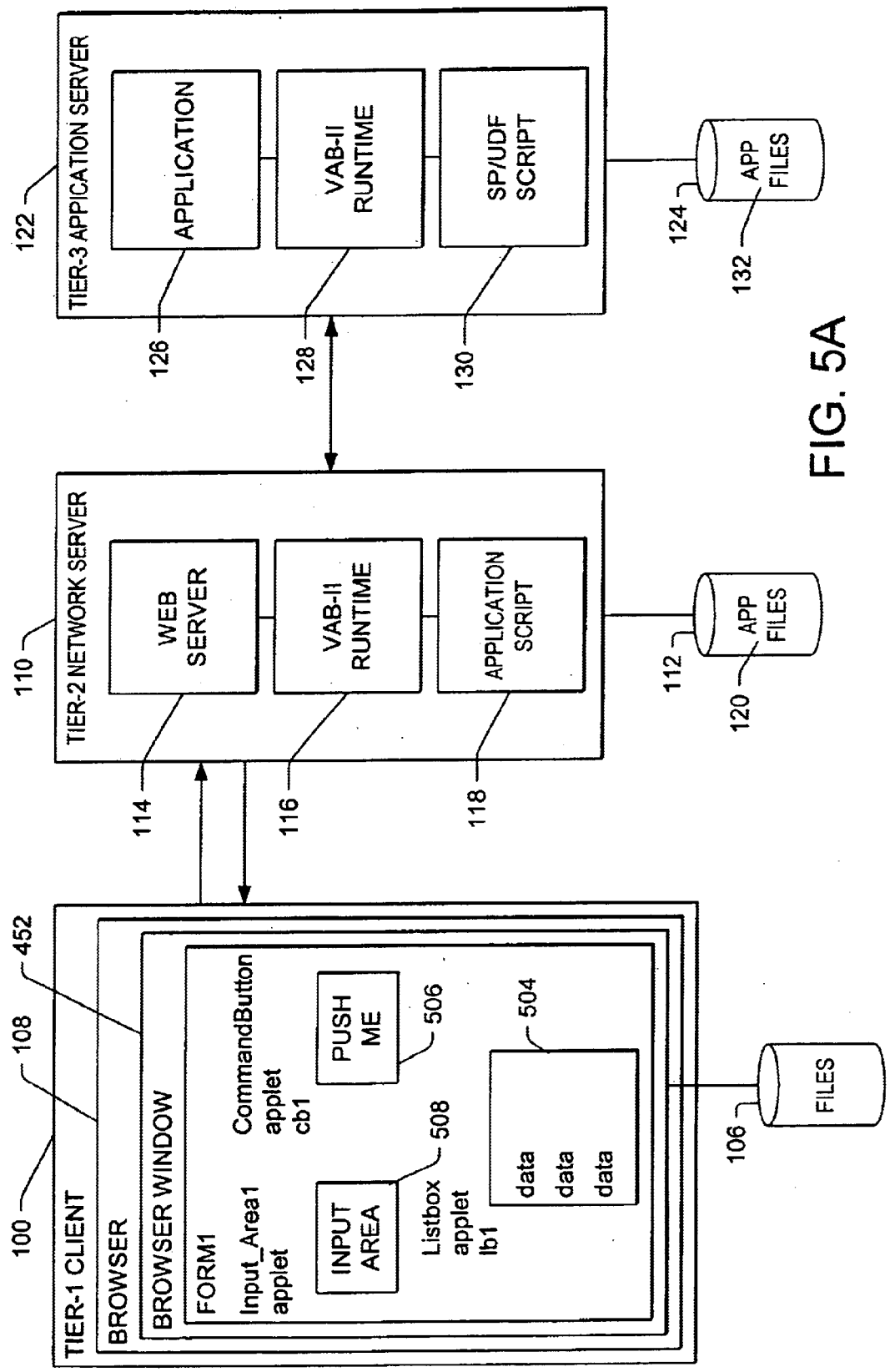
FIGS. 5A and 5B illustrate the use of controls and the remote scripting aspects of the present invention and the method steps used in connection with remote scripting.
Figure 5B:
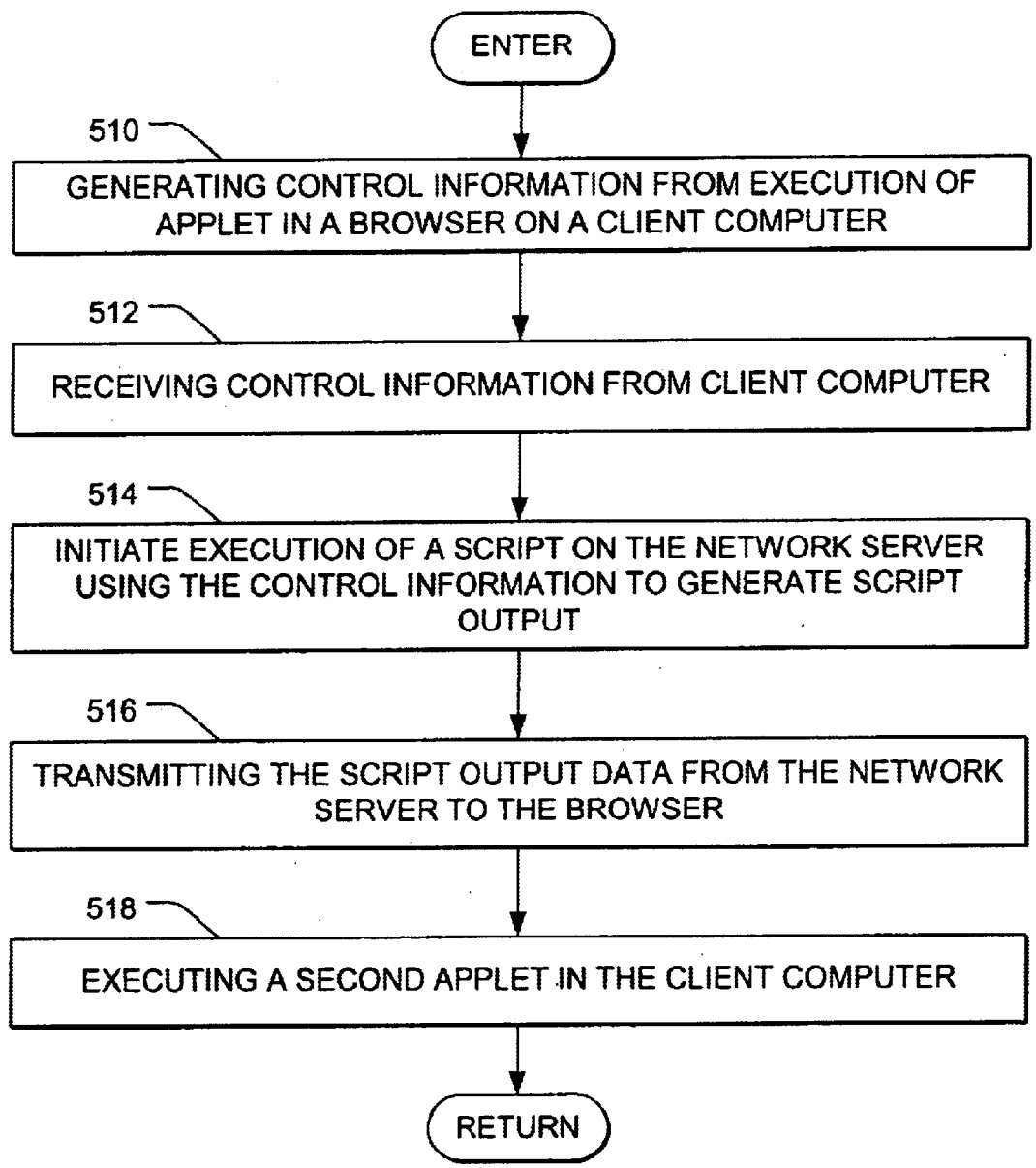

FIGS. 5A and 5B illustrate the use of the controls and the remote scripting aspects of the present invention. There are two types of controls: nonvisual controls and visual controls. Further, there are two categories of visual controls: JAVA applet controls and static controls. Table 1 provides a partial list of JAVA applet controls; Table 2 provides a partial list of static controls; and Table 3 provides a partial list of nonvisual controls.

TABLE 1

| JAVA Applet Controls | |
|---|---|
| Control | Description |
| Label | This control displays a line of text. As an applet control, the text could be changed to show status, or the results of a request. The control does not respond to any events. |
| Button | This control is a push-button. One Button may have its default property set to true, in which case pressing the Enter key on other applets on the page causes the button's click event to be triggered. |
| Listbox | Displays a list of selectable items. An event can be triggered when an item is selected. |

Table 1: JAVA Applet Controls

TABLE 2

| Static controls | |
|---|---|
| Control | Description |
| Heading | This generates a <H1>, <H2>, or <H3> HTML tag depending on its properties. |
| Text | This generates a <P> HTML tag. |
| List | This generates a <UL> or <OL> HTML tag. depending on its properties. List items are typed directly in the list area. |
| Image | This generates a <IMG> HTML tag. |
| Hypertext Link | This generates a <A> HTML tag. |

Table 2: Static controls

TABLE 3

| Nonvisual controls | |
|---|---|
| Control | Description |
| Timer | To trigger a periodic event. |
| Data | To control data bound controls. |

"Nonvisual controls" have no visual representation on the client 102. An example of nonvisual controls is a "timer" used by the developer to cause time-based events. There may be a nonvisual control that represents a form or an entire application. The purpose of these two examples would be to maintain properties and states of forms and applications.

"Visual controls" are those that have a visual representation on the client. The visual controls fall into two categories: JAVA applet controls and static controls. JAVA applet controls support invocation of scripts stored on the network server 110 and have properties that can be changed at runtime. Static controls are represented by HTML tags on the generated form, and no scripting or setting of properties at runtime is supported.

All visual controls that are scriptable are implemented as JAVA applets that communicate to the network server via HTTP. Nonvisual controls may or may not be implemented as JAVA applets, depending on whether or not they need to be present and running in the browser 102 (if they do, they are applets; otherwise, they are not).

For example, a nonvisual control representing a "timer" might be implemented as an applet, run in the browser 108, and communicate with the network server 110 when the timer "pops". In another example, the timer might be implemented as a script and run in the network server 110 in which case it is not an applet. In alternative embodiments, other containers (non-browsers) and other communication mechanisms (such as sockets) will be supported.

A JAVA applet is created for each scriptable control provided by the present invention. These applets may be customized by the developer. Since there is one applet per control, if there are five command buttons (for example) on one form, only one copy of the command button applet is downloaded to the client browser 108. This applet remains in the browser cache.

In the preferred embodiment, applet controls communicate back to the tier-2 VAB-II runtime module through the web server 114. This communication allows the present invention to remotely script local objects. Nominally, this is performed via HTTP, but in alternative embodiments, other mechanisms can be considered, such as socket level communication or other communication protocols.

A unique feature of the present invention is the capability to allow creation of local applets on the client which cause execution of scripting on remote machines with two-way communications between the local applet and the remote script. This technique has several advantages over prior art methods. For example, two-way communication and remote scripting allows the scripts to be stored and managed solely at the network server, resulting in greater code security and integrity. This feature also allows reduced data communications between the client and the network server, since operations may be intelligently shared between the two to minimize data transfer. Finally, since the client browser can cause execution of potentially lengthy scripts in the network server, this feature minimizes client processing and memory requirements.

This feature is further described with respect to FIG. 5A, which illustrates the flow of control information between applets in the client browser and the network server. In the present invention, when a user causes an event to be triggered on an applet, control information flows from the applet in the browser to the network server. FIG. 5A illustrates a form (FORM1), an applet called COMMAND_BUTTON1 506 on FORM1, and an applet called INPUT_AREA1 508 on FORM1, which are contained in an application APP1.

When FORM1 is displayed by the browser 108 and when a command button applet is "pressed", the associated JAVA applet invokes a universal resource locator (URL) to communicate with the running instance of the application on the network server 110.

The information that must flow from the JAVA applet to the network server 110 includes:

An identification of the application instance (or null). This can be either via authentication, where an authenticated user identifies uniquely the application instance, or a "hidden variable" containing an application instance identifier (this is insecure), or another means. If this is null, there is not yet an application instance created, which means that this is a "first call" and it will cause the application instance to be created.

The application name, e.g., APP1.

The name of the control causing the event, e.g., COMMAND_BUTTON1 506.

The event, e.g., ButtonClick.

The form on which the event occurred, e.g., FORM1.

Other state data, such as the current value of INPUT_AREA1 508 if it is changed. The developer may not have created an OnChanged event for INPUT AREA1 508. In this case, when COMMAND_BUTTON1 506 is pressed, the current state of INPUT_AREA1 508 may not be accurate on the network server 110. Therefore, applets containing new state information are synchronized with the server whenever an event causes a flow from the client browser 108 to the network server 110 (this is why timer in the previous example is an applet in the client browser 108 and not just a network server object). This is analogous to HTML forms processing, where changes are "batched" before communicating with the network server for efficiency.

When the interface from the applet to the network server 110 is HTTP, a sample URL for the above might look like: "http://www.someco.com/cgi-bin/OurProduct ? app=APP1+appinstance=ab12cdef+form=FORM1+control=COMMAND_BUTTON1+event=ButtonClick+other1=INPUT_AREA1 (user input from input_area1)+other2= . . ."

The ButtonClick event is associated with a script on the network server 110. In this example, the script includes programming that accesses the application server A through VAB-II Runtime 116 and returns data into a listbox (LB1) 504 in FORM1. The data returned (script output data) from the application 122 and network servers 110 to the command button comprise a data string.

This data string might, for example, be "ADD DATA1 DATA2 DATA3 TO LB1". In this very simple example, this is a command string that the listbox 504 understands, and that the command button 506 now has in its possession. As illustrated, the data string comprises only a portion of an HTML page, relieving the need to transmit an entire HTML page merely to update a portion of a page. The data string may also comprise an entire HTML page. Alternatively, the data string may also comprise information used to execute a second applet in the client browser 108.

Getting the command string from the command button 306 to the listbox 504 is an example of applet-to-applet communication. It is facilitated by the fact that the command button 506 can retrieve a reference to LB1 504 from the list of name-reference pairs being kept in static data (command button 506 and listbox 504 are derived from the common base applet keeping this data). The command button 506 uses the reference to LB1 504 to invoke the listbox's "execute" method (which must be public), giving it the command string to update its contents.

FIG. 5B is a flow chart illustrating the method steps employed in implementing the foregoing. First, control information is generated by an applet in the browser 108. This is illustrated in block 510. That control information is transmitted from the client 102 to the network server 110 and received 512 therein. Next, using this control information, a script is executed on the network server 110. This is represented by block 514. Execution can be initiated either by the receipt of the control information, or by other means. Next, as shown in block 516, the resulting script output data is then transmitted from the network server to the browser 108, where if desired, the data can be diplayed on the browser 108 or used to execute 518 an applet in the browser 108.

HTML Page Switching

Figure 6A:
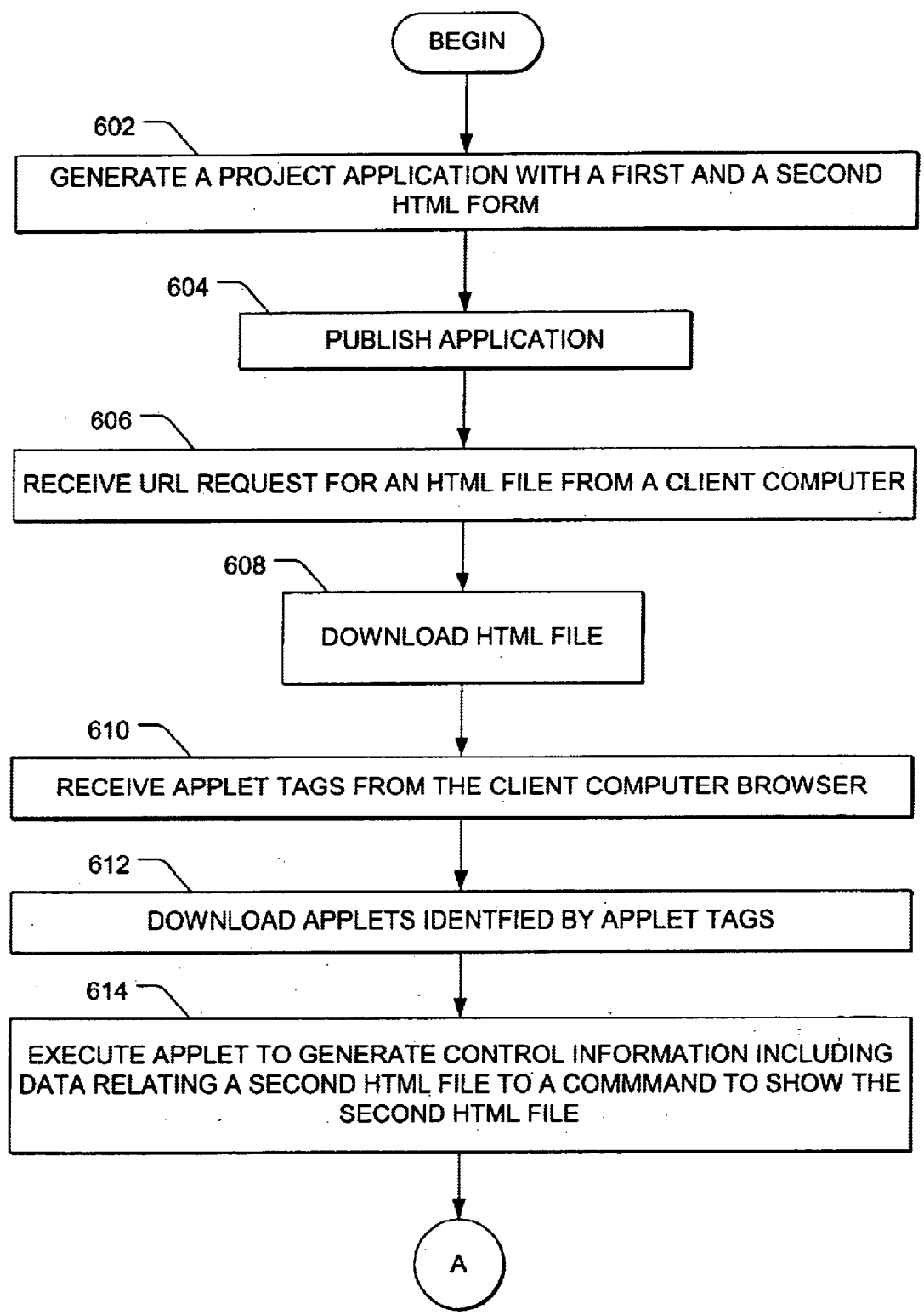
FIGS. 6A and 6B are flow charts illustrating the operations performed in the programmatic switching of the present invention.
Figure 6B:
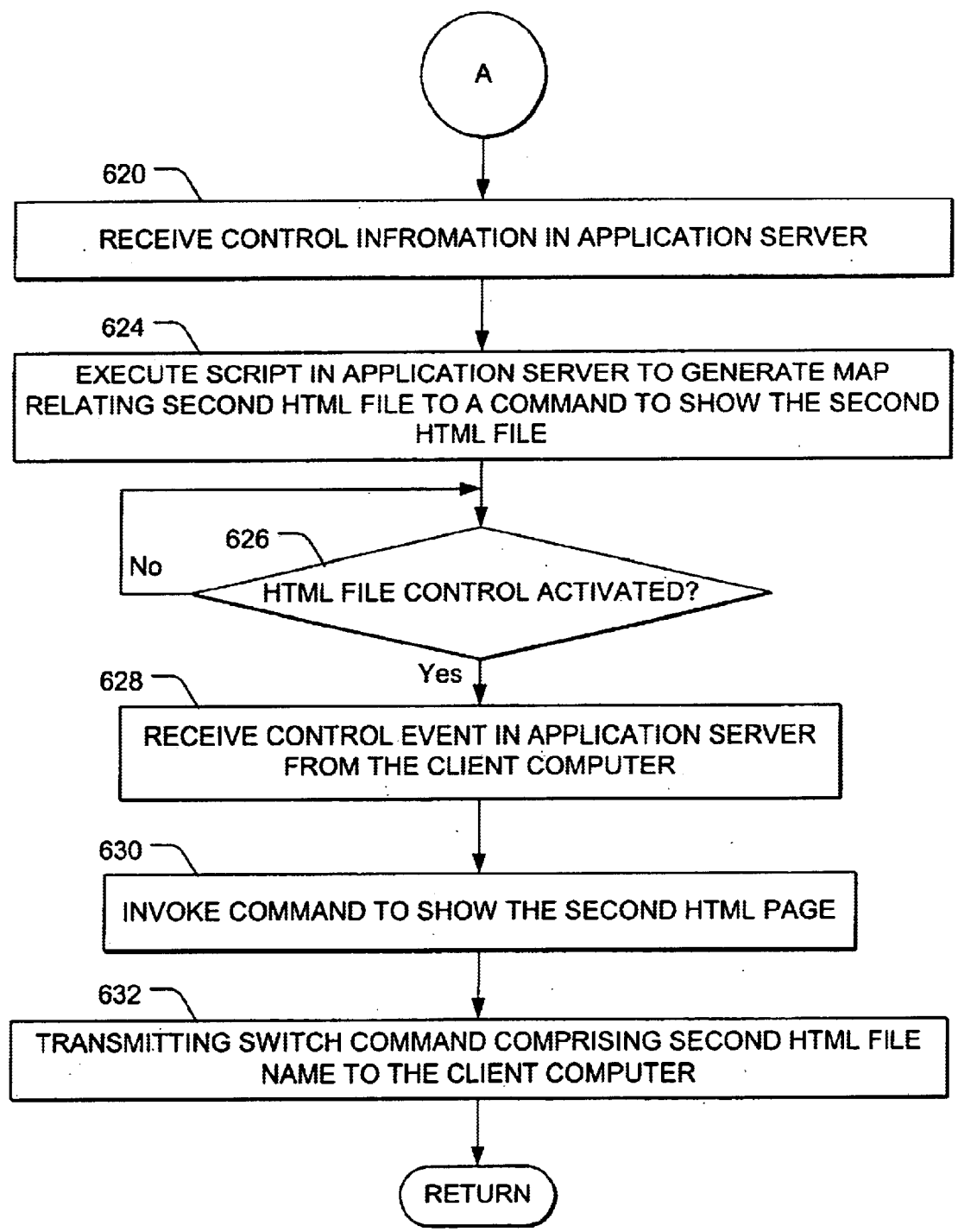

FIGS. 6A and 6B are diagrams showing the operations used to perform one embodiment of the present invention. The operations described in FIGS. 6A and 6B will be further described with respect to FIGS. 7–10. The process begins with the creation of a VAB-II project, as shown in block 602.

Figure 7:
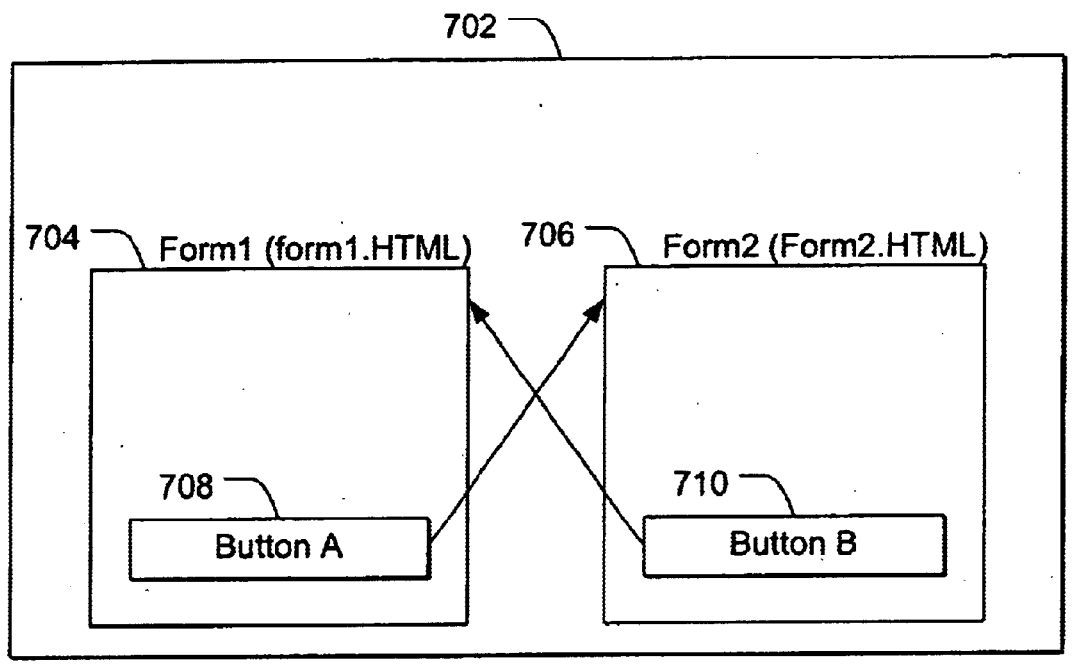
FIG. 7 is a diagram showing the creation of a project with two forms.

FIG. 7 is a diagram showing a representation of the created VAB-II project. The project comprises an application 702, hereinafter referred to as application1, with a first HTML page or form 704, hereinafter referred to as Form1, which is associated with and implemented by the HTML and applet tags in Form1.HTML, and a second HTML page or form 706, hereinafter referred to as Form2, which is implemented by the logic in Form2.HTML. Form1 704 comprises a first button control 708, hereinafter referred to as ButtonA, and Form2 706 comprises a second button control 710, hereinafter referred to as ButtonB. In one embodiment, ButtonA 708 and ButtonB 710 are JAVA applet controls.

Application 702 is published to a server, as shown in block 604 of FIG. 6A. This results in two HTML files and one APP file 132, as described herein. Other controls and static text can also be implemented on Form1 704 and Form2 706.

Figure 8:
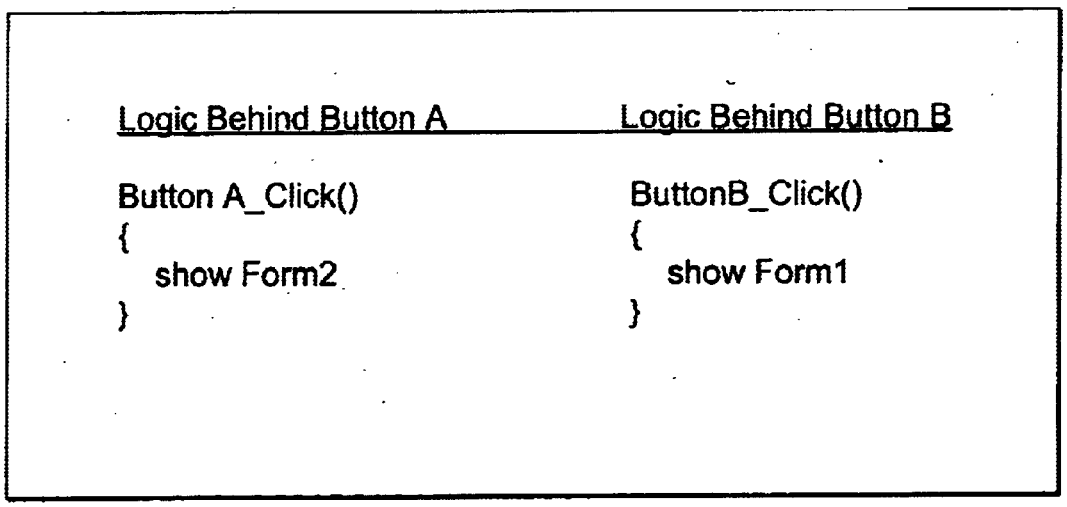
FIG. 8 is a diagram showing the logic behind the button controls illustrated in FIG. 7.

FIG. 8 depicts the programming logic behind ButtonA 708 and Button B 710 for application 702. When a user sees Form1 704 in a browser and clicks ButtonA 708, the view swiches to Form2 706. That is, Form2 706 is loaded into the browser instead of Form1. The reverse happens when Form2 706 is displayed in the browser and the user clicks ButtonB 710.

In the illustrated embodiment, the logic is written in the BASIC programming language, but other languages could be used as well. The programmer debugs this logic, publishes it to the network as depicted in block 604 of FIG. 6A. Further details regarding this process are disclosed in co-pending and commonly owned patent application Ser. No. 08/828,481, entitled "MULTI-TIER DEBUGGING".

When application1 702 is published to the network server 110 internet users (or the programmer, for that matter) can interact with it as described in co-pending and commonly owned application Serial No. 09/102,323, entitled "REMOTE DEBUGGING OF INTERNET APPLICATIONS."

Figures 9, 10:
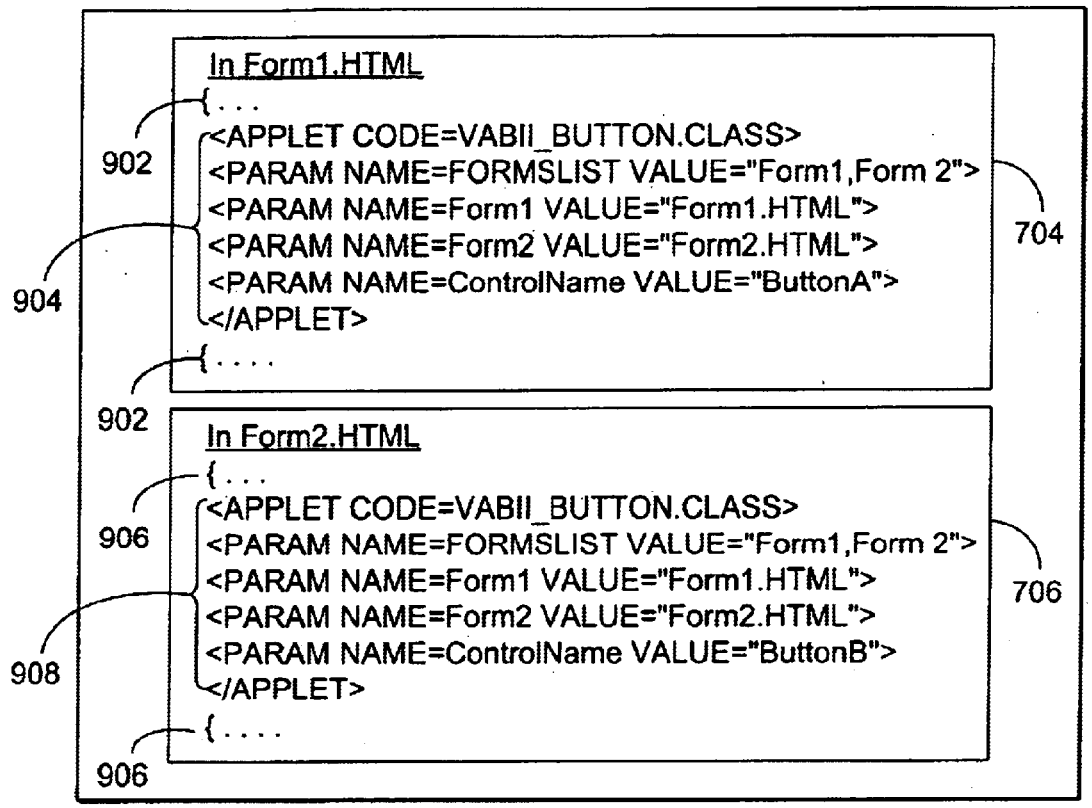
FIG. 9 is a diagram showing applet HTML tags for the applet button controls.
FIG. 10 is a diagram of a mapping from form names to corresponding HTML files.

FIG. 9 shows the HTML for Form1 704 and Form2 706 after publication. Note that information necessary to switch HTML pages is embedded in each HTML page, Form1.HTML 704 and Form2.HTML 706. In addition to other generated HTML 902 and 906 unnecessary for illustrative purposes, Form1 704 includes a first set of applet HTML tags 904, and Form2 includes a second set of applet HTML tags 908. The information in the first and second set of applet parameter tags 904 and 908 is transmitted to the application server 122. This is accomplished as described below with respect to FIG. 6A.

First, a request a URL request for an HTML file is received in the application server 122 via the network server 110 from a client computer 102. This is depicted in block 606. In response, an HTML file (such as Form1.HTML 704) is downloaded from the application server 122 to the client computer 102 via the network server 100. The applet parameter tags 904 and 908 are received from the client computer 102, which initiates the downloading of the applets identified by the applet tags into the client computer 102. These steps are illustrated in blocks 610 and 612. After they are downloaded into the client computer 102, they are initialized and executed by the browser 108. This is depicted in block 614 of FIG. 6A. This execution generates information for the control (ButtonA 708 or ButtonB 710 in this example) and transmits that information to the application server 122. To effect the form switching capability, extra control information is included so that the VAB-II JAVA applet controls provide the application server 122 with information necessary to relate the name used for the form in the application (e.g. Form1) and its HTML representation (e.g. Form1.HTML). This allows the use of arbitrary authoring tools and allows generated HTML to be independent from the logic in the APP files 132.

The control information is then received in the application server 126, as depicted in block 620 of FIG. 6B. Then, as depicted in block 624, an application script 118 is executed in the application server 126. This application script 118 generates a map relating the command to show the HTML file to the command to show the HTML file, in this case, relating "Form2" with Form2.HTML.

FIG. 10 is a diagram showing a mapping relationship between the form name (e.g. Form1 and Form2) with the related HTML file (Form1.HTML 704 and Form2.HTML 706, respectively). The VAB-II runtime 128 in the application server 126 was given this mapping by from the information coded in the <PARAM> tags.

Returning to FIG. 6B, when the user activates an HTML file control by selecting ButtonA 708 for example, the application server 122 receives a control event from the client computer, and invokes the command to show the HTML page by running the "ButtonA_Click( )" code shown in FIG. 8. This logic is depicted in blocks 626 and 628 of FIG. 6B. Because the application server 122 generated an arbitrarily definable mapping between Form2 and Form2.HTML, the "show Form2" command informs the application server 122 that it must return information to the ButtonA applet that will allow switch to Form2 in the browser 108. This is accomplished by invoking a command to show the second HTML page, as depicted in block 630. In one embodiment, this is accomplished via a browser 108 switch command with the second HTML file name, as shown in blocks 630 and 632.

A programmer can also use an enterprise logic authoring tool like VAB-II to implement the foregoing automated page switching logic along a graphical authoring tool like NETOBJECT's FUSION. These commercially available authoring tools enable the user to create attractive, detailed web pages, and help keep the HTML pages and web sites more manageable.

Figure 11:
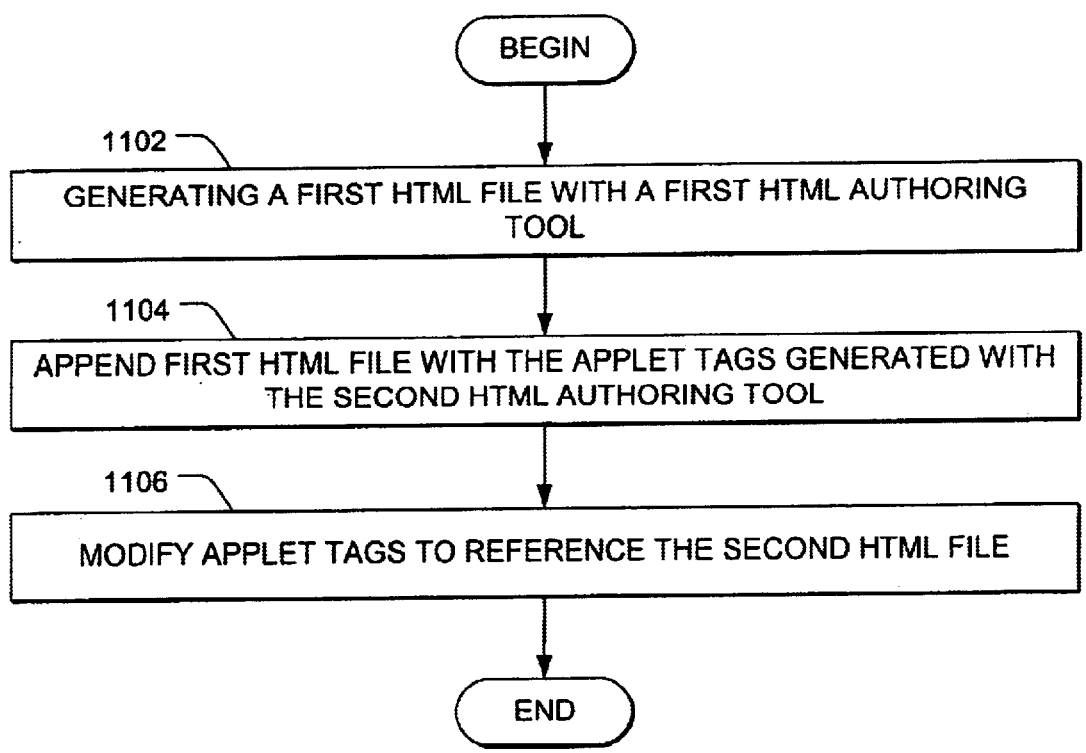
FIG. 11 is a flow chart illustrating the operations employed in using the present invention with an arbitrary HTML authoring tool.

FIG. 11 is a flow chart showing the use of the present invention with an arbitrary HTML authoring tool. First, the programmer uses the authoring tool to create two or more web pages. This is depicted in block 1102.

Figure 12:
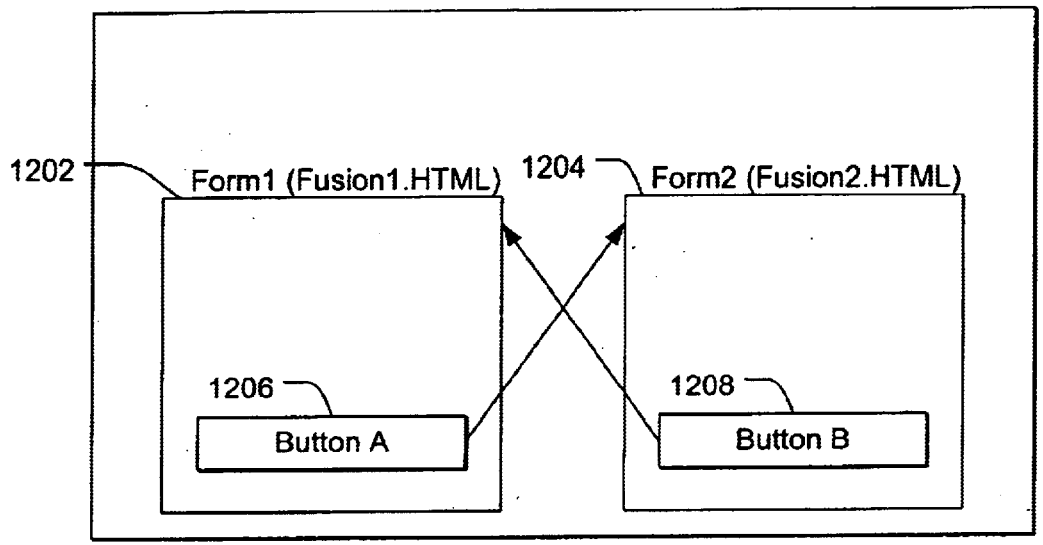
FIG. 12 is a diagram illustrating the use of the present invention with an arbitrary HTML authoring tool.

FIG. 12 is a diagram presenting a depiction of the HTML files generated by an arbitrary HTML authoring tool like FUSION. The files include an HTML file denoted Fusion1.HTML 1202 for Form1 and an HTML file denoted Fusion2.HTML 1204 for Form2.

As shown in block 1104, the programmer then copies the first set of applet HTML tags 904 created for ButtonA 708 from the Form1.HTML 704 generated with the VAB-II logic authoring tool to the Fusion1.HTML file 1202, and the second set of applet HTML tags 906 created for ButtonB 710 from the Form2.HTML 706 to the Fusion2.HTML file 1204. Then, the programmer modifies the applet parameter tags 904 and 908 to reflect the new HTML file names to refer to the FUSION-generated HTML pages. This is depicted in block 1106. Thereafter, the process is analogous to that which is depicted in blocks 604–632 if FIGS. 6A and 6B.

Figure 13:
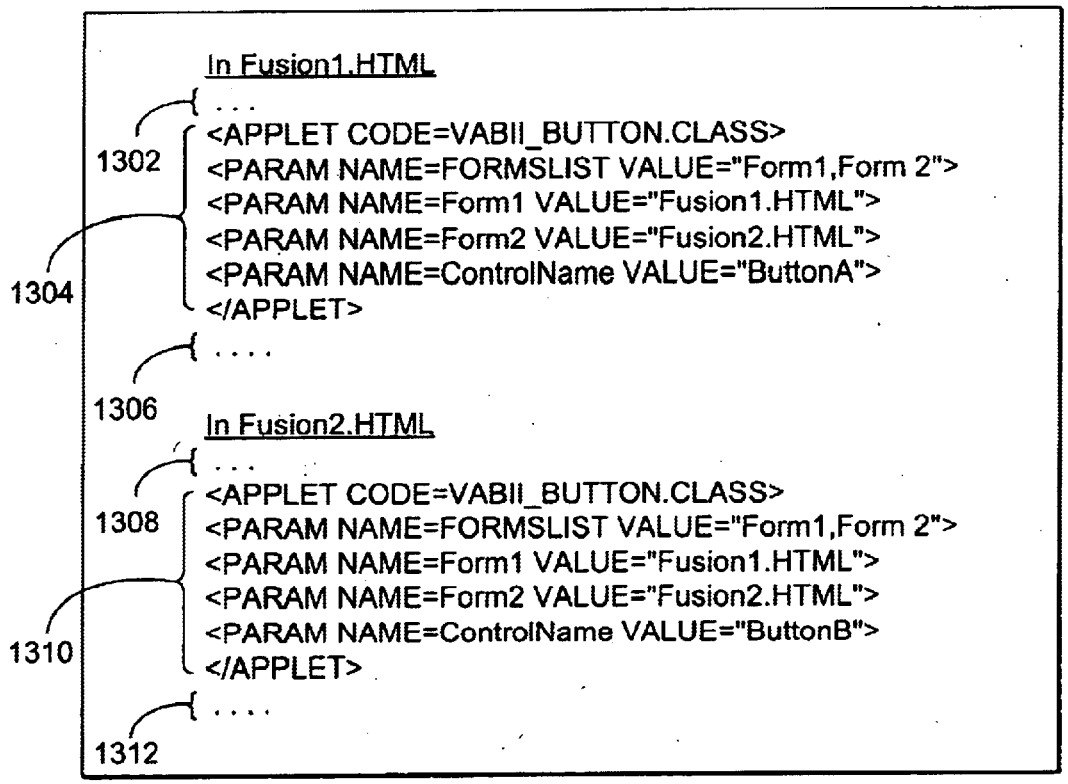
FIG. 13 is a diagram showing applet HTML tags as they appear after modification for arbitrary HTML.

FIG. 13 is a diagram showing the FUSION HTML resulting from the above operations. The Fusion1.HTML file includes other generated HTML 1302 and 1306, and first set of FUSION applet HTML tags 1304, while the Fusion2.HTML file includes other generated HTML 1308 and 1312 as well as a second set of FUSION applet HTML tags 1310. The information in the first and second set of FUSION applet HTML tags 1304 and 1310 contain information which is transmitted to the application server 122 and used to generate the mapping from relating HTML files and commands to show the related HTML pages.

FIG. 14 is a diagram showing the new mapping of form names to HTML pages. This mapping is obtained from the foregoing procedures, and is analogous to the original mapping depicted in FIG. 10.

Although the foregoing illustrates switching between two arbitrary HTML pages, the present invention can be applied to support switching between any number of HTML pages. In such embodiments, the mapped relationships described in FIG. 10 for example, may include any number of mapping entries as required. The foregoing can also be practiced with an automated control or HTML view tool. This tool understands that the controls on the forms are represented by applet tags and can cut and paste them visually, instead of by use of a text editor. The tool can also understand file names and automatically adjust the name that the programmer hand-edited in the foregoing description (such as changing Form1.HTML and Form2.HTML in the corresponding HTML files).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for switching a browser from a first HTML file to a second HTML file. The method comprises the steps of receiving control information in an application server from a client computer, and executing a script in the application server to generate a map relating HTML files with commands to show pages related to the HTML files. When a control event is received from the client computer, the mapping provides a basis for commanding the client computer's browser to switch to a second HTML page. In one embodiment, the invention also comprises a program storage device, tangibly embodying instructions for performing the above method steps.

The invention also comprises an apparatus for remotely scripting local objects. The apparatus includes an application server having means such as a computer for receiving control information from a client computer, and a means for executing a script using the control information to generate a map relating a second HTML file with a command to show the second HTML file.

The present invention therefore provides a method, apparatus, article of manufacture, and a memory for programmatic switching of arbitrary HTML forms. Unlike prior art systems and methods, the present invention does not use anchor tags fixed inside the HTML page itself, and thus, the logic implementing the page switching is independent of the HTML filenames can be modified without generating new HTML.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of switching a browser implemented on a client computer from a first HTML file to a second HTML file, comprising the steps of:

receiving control information in an application server from the client computer, the control information derived from execution of an applet in the first HTML file, wherein the control information comprises data relating the second HTML file and a command to show an HTML page associated with the second HTML file; and executing a script on the application server using the control information to generate a map relating the second HTML file and the command to show the second HTML page.

2. The method of claim 1, further comprising the steps of:

receiving a control event from the client computer in the application server when a first HTML file control is activated, wherein the control event invokes the command to show the second HTML page;

mapping the command to show the second HTML page to a second HTML file name for the second HTML file; and transmitting a switch command comprising the second HTML file name to the client computer.

3. The method of claim 2, further comprising the steps of:

generating the first HTML file with an arbitrary first HTML authoring tool;

generating the applet with a second HTML authoring tool the applet comprising applet tags;

copying the applet tags generated with the second HTML authoring tool to the first HTML file; and modifying the applet tags to reference the second HTML file.

4. The method of claim 3, wherein the applet tags comprises applet parameter tags including the control information, and the step of modifying the applet tags to reference the second HTML file comprises the step of modifying the applet parameter tags to reference the second HTML file.

5. A method of switching a browser implemented on a client computer from a first HTML file to a second HTML file, comprising the steps of:

receiving control information from the browser, the control information derived from execution of an applet in the first HTML file and comprising data relating a file name for the second HTML file with a command to show the second HTML file; and switching the browser to the second HTML file when a control event invoking the command to show the second HTML file is received from the browser.

6. The method of claim 5, wherein the step of switching the browser comprises the steps of:

receiving the control event from the browser;

mapping the command to show the second HTML file to the file name for the second HTML file; and transmitting a switch command comprising the file name for the second HTML file from an application server to the browser.

7. An apparatus for switching a browser implemented on a client computer from a first HTML file to a second HTML file, comprising:

means for receiving control information in an application server from the client computer, the control information derived from execution of an applet in the first HTML file, wherein the control information comprises data relating the second HTML file with a command to show an HTML page associated with the second HTML file; and an application server for executing a script using the control information, to generate a map relating the second HTML file and the command to show the second HTML page.

8. The apparatus of claim 7, further comprising:

means for receiving a control event from the client computer in the application server when a first HTML file control is activated, wherein the control event invokes the command to show the second HTML page;

means for mapping the command to show the second HTML page to a second HTML file name for the second HTML file; and means for transmitting a switch command comprising the second HTML file name to the client computer.

9. The apparatus of claim 8, further comprising:

a first HTML authoring tool for generating the first HTML file;

a second HTML authoring tool for generating the applet; and means for appending the first HTML file with the applet generated by the second HTML authoring tool and for modifying the applet to reference the second HTML file.

10. The apparatus of claim 8, wherein the means for appending the first HTML file with the applet and for modifying the applet to reference the second HTML file comprises a control view tool.

11. A program storage device, readable by computer having a processor and a memory, tangibly embodying one or more programs of instructions executable by the computer to perform the method steps of switching a browser implemented on a client computer from a first HTML file to a second HTML file, the method steps comprising the steps of:

receiving control information in an application server from the client computer, the control information derived from execution of an applet in the first HTML file, wherein the control information comprises data relating the second HTML file and a command to show an HTML page associated with the second HTML file; and executing a script on the application server using the control information to generate a map relating the second HTML file and the command to show the second HTML page.

12. The program storage device of claim 11, wherein the method steps further comprise the steps of:

receiving a control event from the client computer in the application server when a first HTML file control is activated, wherein the control event invokes the command to show the second HTML page;

mapping the command to show the second HTML page to a second HTML file name for the second HTML file; and transmitting a switch command comprising the second HTML file name to the client computer.

13. The program storage device of claim 12, wherein the method steps further comprise the steps of:

generating the first HTML file with a first HTML authoring tool;

generating the applet with a second HTML authoring tool;

appending the first HTML file with the applet generated with the second HTML authoring tool; and modifying the applet to reference the second HTML file.

14. The program storage device of claim 13, wherein the applet comprises applet parameter tags including the control information, and the method step of modifying the applet to reference the second HTML file comprises the method step of modifying the applet parameter tags to reference the second HTML file.

15. A memory for storing data for access by an application being executed on an application server, comprising:

a data structure stored in said memory, including;

a map relating a second HTML file with a command to show a second HTML page, the command invokable by activating a control on a first HTML page, the map generated from control information derived from execution of an applet in the first HTML page.

16. The memory of claim 15, wherein the map is generated by executing a script using the control information in the application server.

* * * * *